Inventor
Hisashi Saito
By Stevens, Davis, Miller & Mosher
ATTORNEYS

SECRET SCA COMMUNICATION SYSTEMS AND APPARATUS

Filed Feb. 19, 1965 7 Sheets-Sheet 2

Inventor
Hisashi Saito
By Stevens, Davis, Miller & Mosher
ATTORNEYS

Inventor
Hisashi Saito
By Stevens, Davis, Miller & Mosher
ATTORNEYS

Inventor
Hisashi Saito
By Stevens, Davis, Miller & Mosher
ATTORNEYS

Inventor
Hisashi Saito
By Stevens, Davis, Miller & Mosher
ATTORNEYS

Inventor
Hisashi Saito
By Stevens, Davis, Miller & Mosher
ATTORNEYS

Inventor
Hisashi Saito
By Stevens, Davis, Miller & Mosher
ATTORNEYS

United States Patent Office 3,478,169
Patented Nov. 11, 1969

3,478,169

SECRET SCA COMMUNICATION SYSTEMS AND APPARATUS

Hisashi Saito, Hirakata-shi, Japan, assignor to Matsushita Electric Industrial Co., Ltd., Kadoma-shi, Osaka, Japan, a corporation of Japan Filed Feb. 19, 1965, Ser. No. 434,038
Claims priority, application Japan, Feb. 24, 1964, 39/9,883, 39/9,884; May 12, 1964, 39/27,025, 39/27,026
Int. Cl. H04j 1/02
U.S. Cl. 179—15 8 Claims

ABSTRACT OF THE DISCLOSURE

A subsidiary communication authorization communication system including a transmitting and receiving side is disclosed. The system includes a means for inserting a disturbance signal at the transmitting side, and for removing the disturbance signal at said receiver side. The disturbance signal is synchronized by one of a number of signals which may be a commercial supply frequency, harmonics of a commercial supply frequency, subharmonics of a 19 kc. pilot carrier or a selected audio frequency below 8 kc.

The present invention relates to radio communication system, and more particularly to so-called "SCA" (Subsidiary Communications Authorization) systems of communication.

SCA communication service is for particular contractor. In conventional systems of this kind, simple receivers are used, therefore, the significance of the contract is not esteemed so high.

The primary object of the present invention is to provide a SCA communication system and apparatus, in which a disturbance signal is transmitted in addition to SCA signal, in synchronism with:

(i) Commercial supply frequency or its higher harmonics,
(ii) Subharmonics of 19 kc. pilot carrier as associated with FCC (Federal Communications Commission) stereophonic FM multiplex broadcasting system, or
(iii) Any audio frequency below 8 kc.

At the receiving side, the disturbance signal is readily removed by means of synchronizing signal, because of the fact that the disturbance signal is synchronous, whereby SCA signal of good quality can be received by the contractor, but a non-authorized receiver cannot, because of simultaneous detection of the disturbance signal, resulting in unpleasant signal or insignificant signal.

There are other objects and particularities of the present invention, which will be made obvious from the following description, with reference to the accompanying drawings, in which.

Figure 1A:
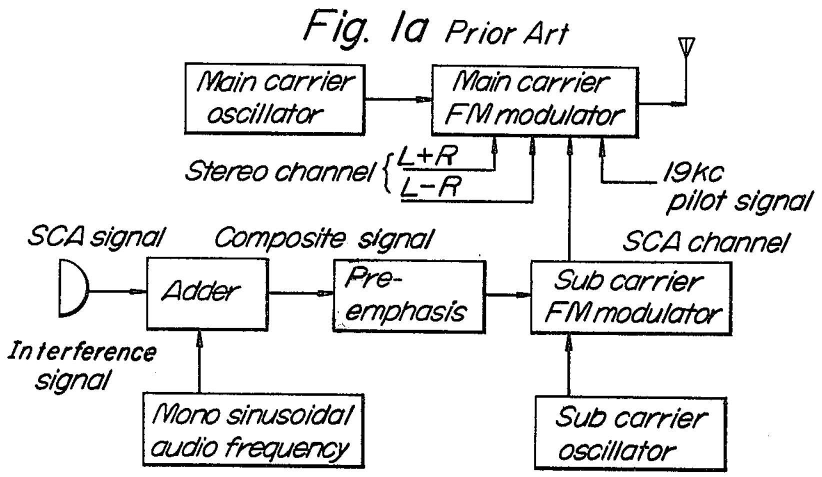
Fig. 1a Prior Art
FIGS. 1 and 2 are block diagrams showing prior systems.
Figure 1B:
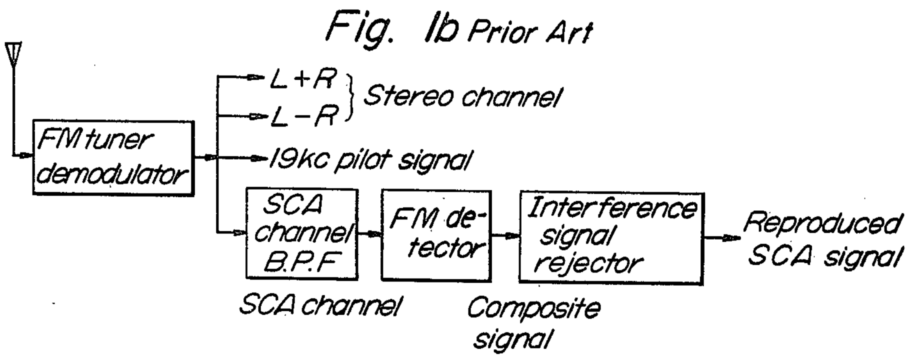
Fig. 1b Prior Art

In a prior system shown in FIG. 1(*a*), a disturbance signal of mono sinusoidal audio frequency waves is added to the SCA signal by means of a mixer to obtain a composite signal, and the SCA subcarrier is frequency modulated by the composite signal. Main carrier is transmitted with frequency modulated by the SCA subcarrier.

At the receiver side, as shown in FIG. 1(*b*), the SCA channel demodulated by a FM-tuner detector is demodulated by a following counter detector, for example. The detector output composite signal, that is, SCA signal plus disturbance signal, is passed through suitable filter, bridge or the like, whereby the disturbance signal of mono sinusoidal audio frequency is removed from the composite signal. A certain frequency in the SCA signal that is same with that of the disturbance signal is also removed simultaneously in this case.

Figure 2:
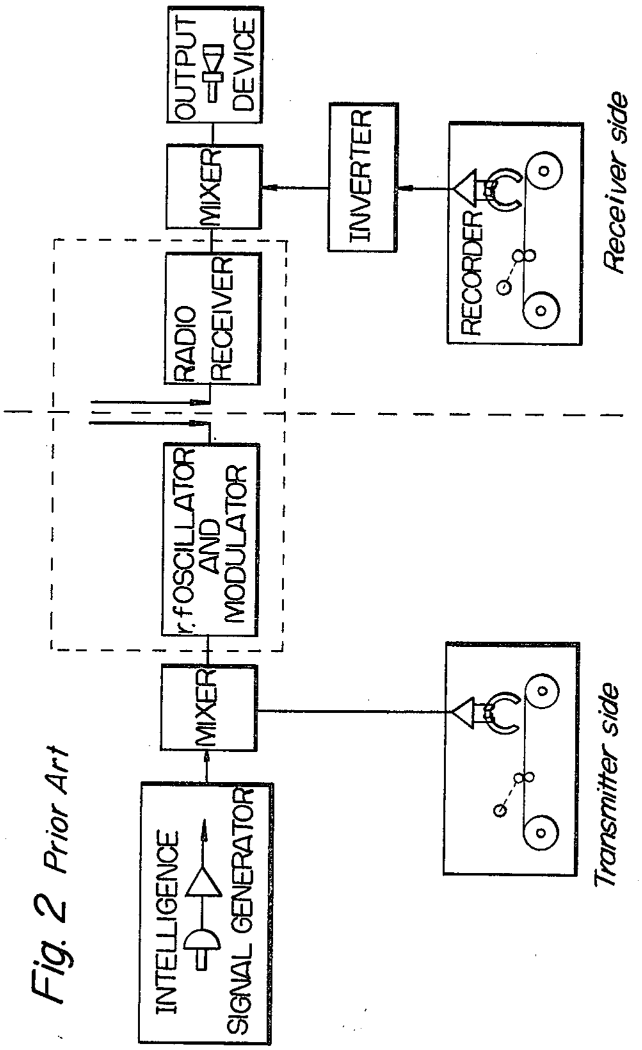
Fig. 2 Prior Art

In a prior system as shown in FIG. 2, recorders are provided at the transmitter and receiver sides, respectively and have recorded therein same disturbance signals. The recorder at receiver side is operated synchronously by synchronizing signal transmitted from the transmitter side for providing inverted disturbance signal of the same level with the disturbance signal from the transmitter side to remove the disturbance signal from the composite signal received.

Figure 3A:
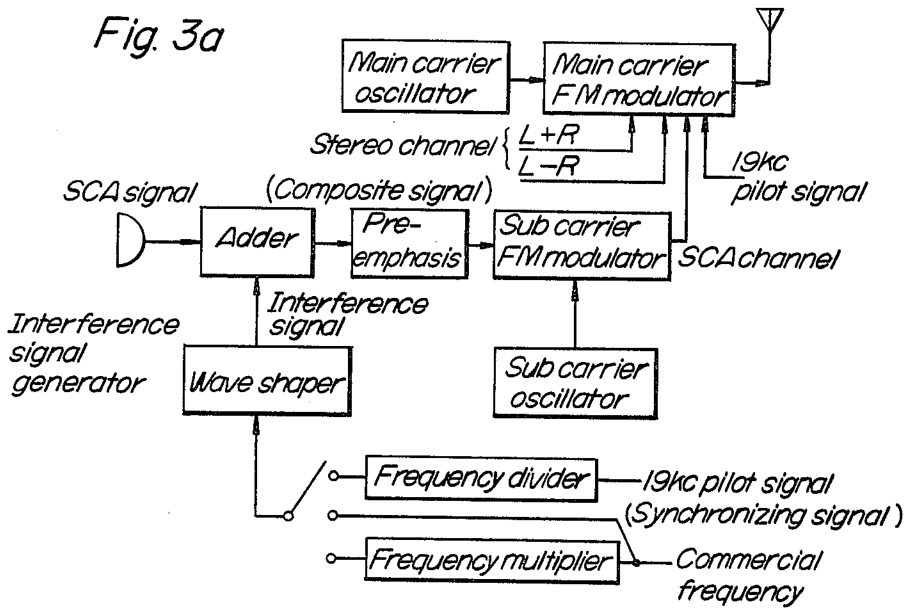
FIGS. 3 to 6 are block diagrams showing various embodiments of the present invention.
Figure 3B:
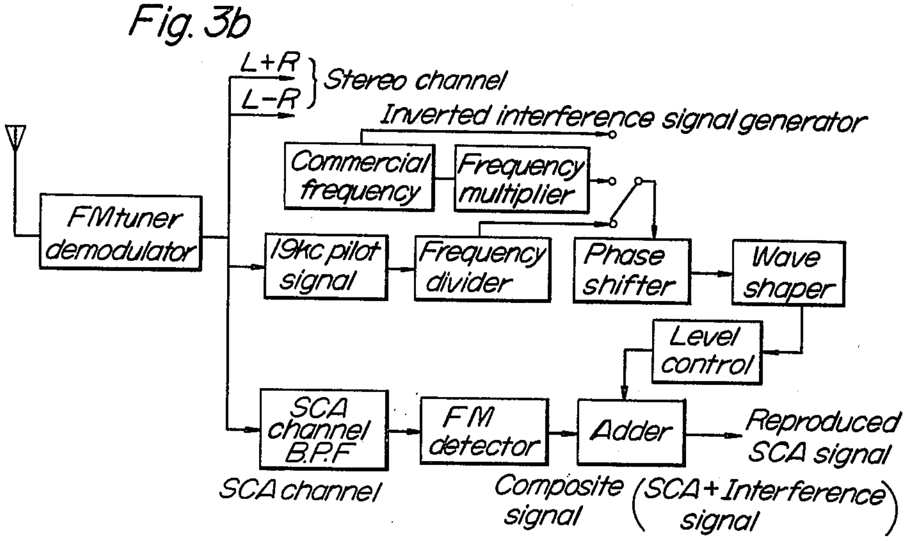

An embodiment of the present invention is shown in FIG. 3.

At the transmitter side shown in FIG. 3(*a*), a synchronizing signal to be described later is made to a disturbance signal of particular waveform, such as rectangular waves, saw-toothed waves, half-rectified waves, etc., containing much higher harmonics, through a particular wave shaper, and such a disturbance signal is superposed on the SCA signal in a mixer circuit to provide a composite signal. The SCA subcarrier is frequency modulated by the said composite signal, and the main carrier is frequency modulated by the said subcarrier and transmitted.

The synchronizing signal for producing the disturbance signal may be:

(a) Subharmonics obtained by passing 19 kc. pilot carrier, as transmitted in association with stereophonic FM multiplex broadcasting, through a frequency divider,
(b) Commercial supply frequency, or
(c) Higher harmonics obtained by passing commercial supply frequency through a frequency multiplier.

At the receiver side shown in FIG. 3(*b*), the SCA channel demodulated by a FM tuner detector is passed further through a FM detector for demodulating the composite signal. On the other hand, an inverted disturbance signal of same waveform, equal amplitude and opposite phase with respect to the disturbance signal is produced there in the inverted disturbance signal generator circuits. This inverted disturbance signal and the said composite signal are added together in an adder for reproducing the SCA signal only.

For producing the inverted disturbance signal, a synchronizing signal same with that employed at the transmitter side is first produced, and then is passed through a phase shifter for inverting the phase thereof. The inverted synchronizing signal is passed further through a particular wave shaper, and an level adjuster for rendering the inverted synchronizing signal same in waveform and amplitude with the disturbance signal from the transmitter side. Thus, the inverted disturbance signal is obtained.

Figure 4A:
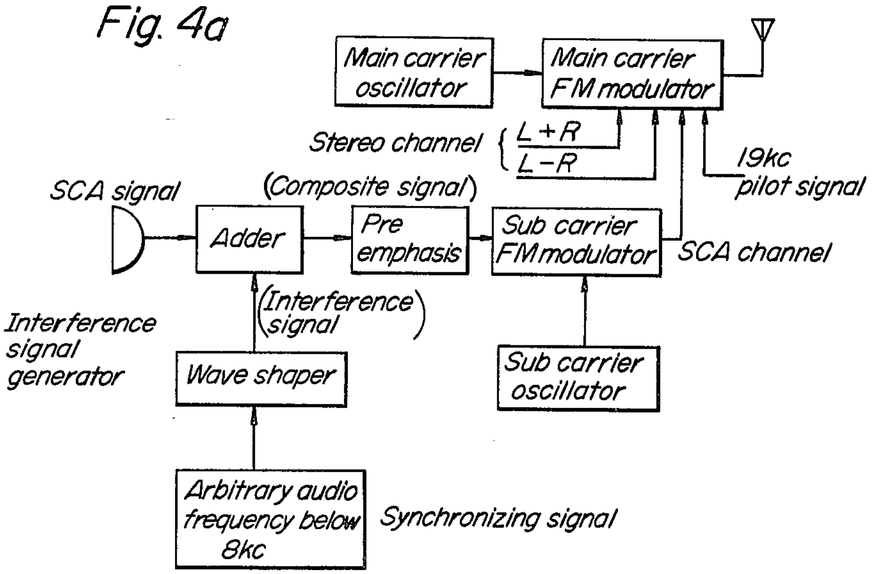
Figure 4B:
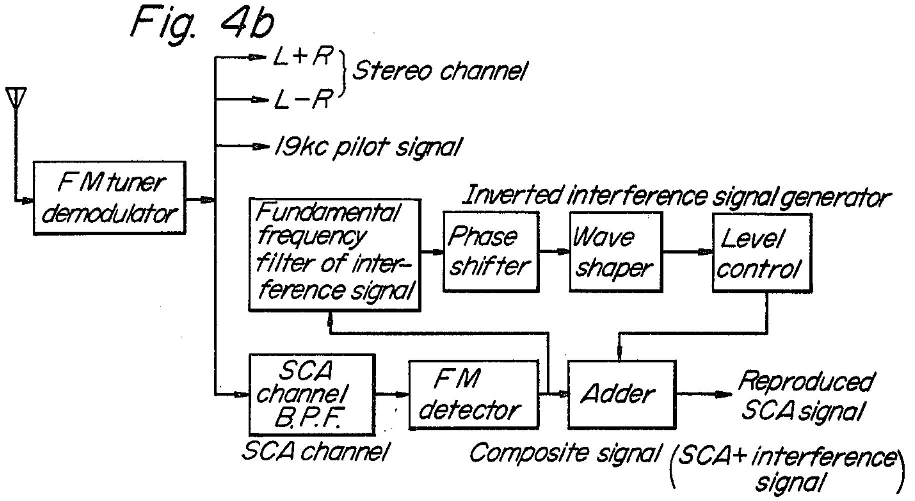
Figure 5A:
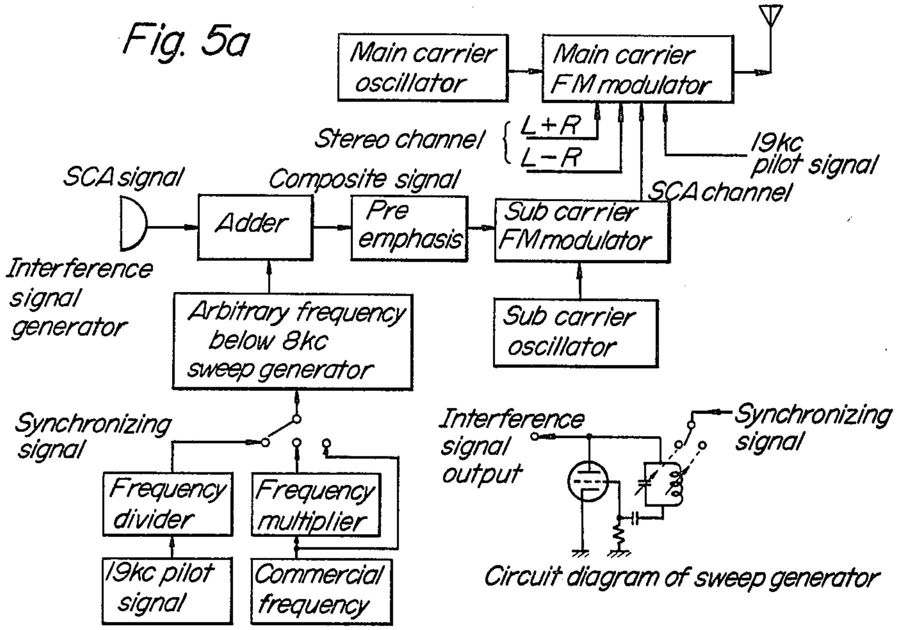
Figure 5B:
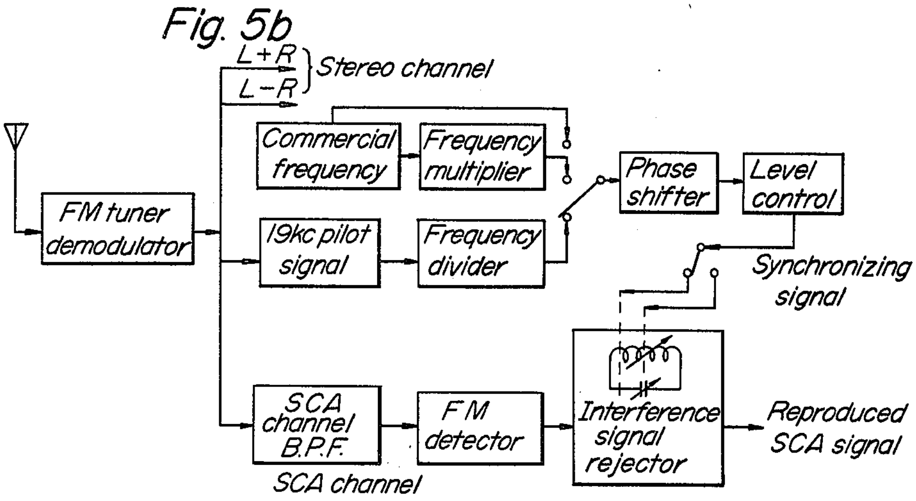
Figure 5C:
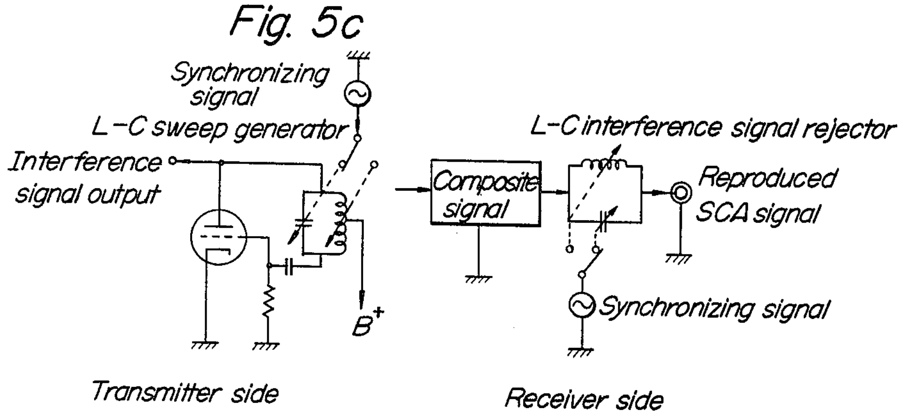
Figure 5D:
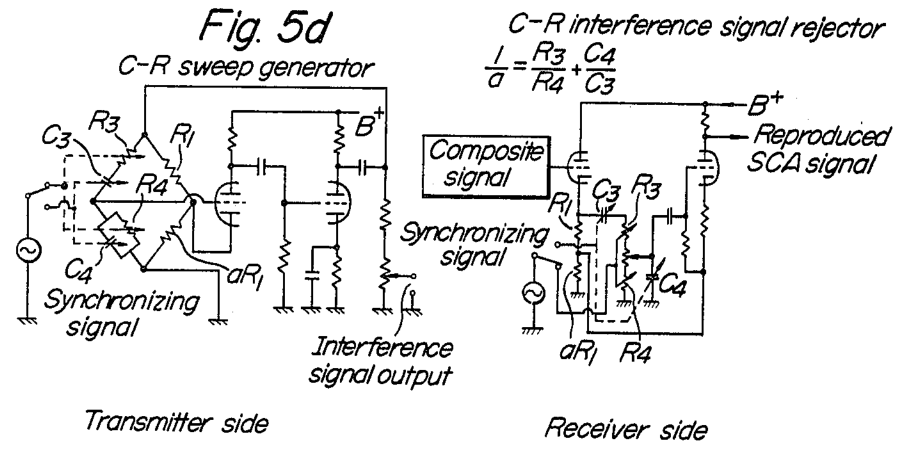

Another embodiment of the present invention is shown in FIG. 4.

At the transmitter side shown in FIG. 4(*a*), a synchronizing signal of any audio frequency lower than 8 kc. is passed through a particular wave shaper for obtaining a disturbance signal of particular waveform containing much higher harmonics, such as rectangular waves, saw-toothed waves, half-rectified waves, or the like. The disturbance signal thus obtained is superposed on the SCA signal in an adder to provide a composite signal. The SCA subcarrier is frequency modulated by the said composite signal and the main carrier is frequency modulated by the said subcarrier and transmitted.

At the receiver side shown in FIG. 4(*b*), the SCA channel demodulated by a FM tuner detector is further passed through a FM detector to demodulate the composite signal. On the other hand, an inverted disturbance signal is produced with same waveform, equal amplitude and opposite phase with respect to the disturbance signal in the composite signal. The said inverted disturbance signal and the composite signal are added together in an adder for reproducing the SCA signal only.

In this embodiment of the invention, since separate synchronizing signal is not transmitted from the transmitter side, the fundamental frequency component forming the distrubance signal is taken out by a filter from the demodulated composite signal, and is employed as the synchronizing signal. This synchronizing signal is passed through a phase shifter to make the same opposite in phase with respect to the disturbance signal, and through a particular wave shaper and a level adjuster to make the synchronizing signal same in waveform and amplitude with the disturbance signal, thus obtaining the inverted disturbance signal.

The third embodiment of the invention is shown in FIG. 5.

At the transmitter side shown in FIG. 5(*a*), a disturbance signal, sweep generator output with an arbitrary center frequency below 8 kc. swept by a synchronizing signal described later is superposed on the SCA signal in a mixer to form a composite signal, which, in turn, frequency modulates the SCA subcarrier, and the main carrier is frequency modulated by the said subcarrier and transmitted. The sweep generator may be the type shown in FIG. 5(*c*), in which LC constants of LC oscillator is changed by being swept with the synchronizing signal, or the type shown in FIG. 5(*d*), in which CR constants of CR Wien Bridge oscillator is changed by being swept with the synchronizing signal.

The synchronizing signals of these sweep generators may be any of the following:

(a) Subharmonics obtained by passing 19 kc. pilot carrier as transmitted in association with stereophonic FM multiplex broadcasting system, through a frequency divider,
(b) Commercial supply frequency, and
(c) Higher harmonics obtained by passing commercial supply frequency through a frequency multiplier.

At the receiver side shown in FIG. 5(*b*), SCA channel is demodulated by FM tuner detector and the composite signal is demodulated by a FM detector. The disturbance signal in this composite signal is rejected synchronously by a LC or CR disturbance signal rejector whose LC or CR constants being same with that of used in LC or CR sweep generator are swept by a synchronizing signal in phase and same width with that of disturbance signal in composite signal. And, thus only the SCA signal is reproduced. FIG. 5(*c*) shows a practical example of using the LC sweep generator at transmitter side and LC disturbance signal rejector at receiver side. FIG. 5(*d*) shows another practical example of using the CR sweep generator at transmitter side and CR disturbance signal rejector at receiver side.

The synchronizing signal should be one of subharmonics obtained by passing 19 kc. pilot carrier demodulated by the FM tuner detector through a frequency divider, commercial supply frequency, and higher harmonics obtained by passing the latter through a multiplier, that is used at the transmitter side.

Figure 6A:
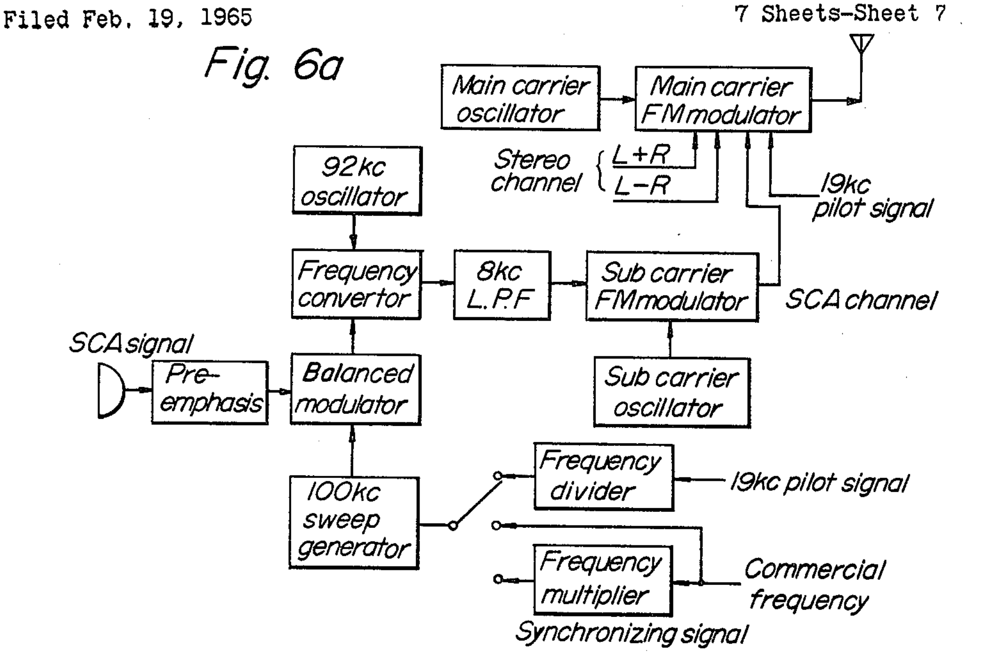
Figure 6B:
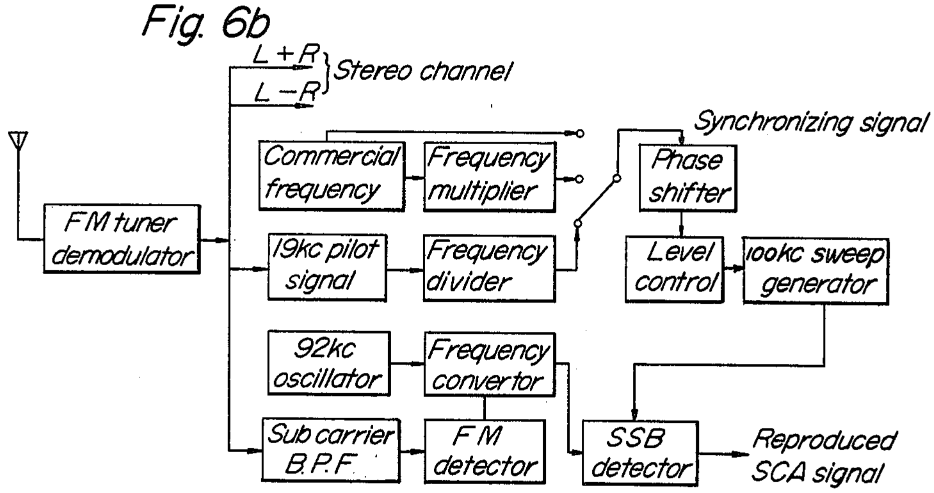

The fourth embodiment of the invention is shown in FIG. 6.

At the transmitter side shown in FIG. 6(*a*), 100 kc. sweep generator is swept with synchronizing signal described later, and the sweep generator output thus obtained and the SCA signal are applied to a balance modulator for generating both-side band waves which are led to a frequency convertor and beated down by a 92 kc. local oscillator. The resulting waves are passed through a low-pass filter, and the lower side band waves only are taken out. This derived SCA signal frequency modulates the SCA subcarrier. And the main carrier is frequency modulated by the subcarrier and transmitted.

The synchronizing signal should be either one of the following:

(a) Subharmonics obtained by passing 19 kc. pilot carrier as transmitted in association with stereophonic FM multiplex broadcasting system, through a frequency divider,
(b) Commercial supply frequency, and
(c) Higher harmonics obtained by passing commercial supply frequency through a multiplier.

At the receiver side shown in FIG. 6(*b*), the SCA channel demodulated by a FM tuner detector is further demodulated by a FM detector. Both the output from the detector and 92 kc. oscillator output are injected into a frequency convertor to produce upper side band waves, and both the upper side band waves and 100 kc. sweep generator output swept with a synchronizing signal same with that employed at the transmitter side in phase and by same sweep width, are led into a single side band detector for demodulating the SCA signal.

The synchronizing signal should be same with that employed at the transmitter side, which may be subharmonics obtained by passing 19 kc. pilot carrier demodulated by the FM tuner detector through a frequency divider, commercial supply frequency, or higher harmonics obtained by passing the latter through a multiplier.

According to the present invention, the synchronizing signal at the transmitter side is transmitted as:

(i) Composite signal with the superposed SCA signal, in the form of disturbance signal of particular waveform containing more higher harmonics in the first and second embodiments,
(ii) Composite signal with the superposed SCA signal, in the form of disturbance signal of sweep generator output swept with the synchronizing signal in the third embodiment, or
(iii) Sweep generator output swept with the synchronizing signal, and the output is balance modulated by SCA signal in the fourth embodiment.

At the receiver side, SCA signal of good quality is demodulated only by:

(i) Producing inverted disturbance signal for cancelling the disturbance signal from the synchronizing signal in the first and second embodiments,
(ii) Rejecting the disturbance signal synchronously with a disturbance signal rejector swept by the synchronizing signal in the third embodiment, or
(iii) Injecting sweep generator output swept by synchronizing signal into a single side band detector to demodulate SCA signal synchronously in the fourth embodiment.

In conventional SCA receivers, however, when signals are received from the transmitter described in the present specification:

(i) The disturbance signal containing much higher harmonics is demodulated simultaneously with the SCA signal in the first and second embodiments, thus giving displeased feeling which cannot readily be removed by mere additional provision of mono-sinusoidal-wave rejecting filter.
(ii) The disturbance signal of instantaneously varying audio frequency are demodulated simultaneously with the SCA signal in the third embodiment, thus giving displeased feeling which cannot readily be removed by mere additional provision of monosinusoidal-wave rejecting filter, and
(iii) In the fourth embodiment a simple single side band detector cannot effect good demodulation, by virtue of the fact that incomprehensible signal of inverted spectrum is provided with beating.

Thus, any unauthorized receiver can never operate in proper manner.

As has been understood from the foregoing explanation, the disturbance signal may be varied with regard to its repetitional frequency, its magnitude (say, amplitude in the first and second embodiments and sweep width in the third and fourth embodiments), and/or its waveform (say, flowing angle of half-rectified waves), for providing multiplicity of disturbance signal, thus enabling service of many SCA stations. In a particular SCA station also, the combination of these many kinds of disturbance signals may be changed periodically for assuring complete prevention of stealthy receiving.

What is claimed is:

1. A Subsidiary Communication Authorization (SCA) communication system comprising a transmitter side and a receiver side, said transmitter side including a 19 kc. pilot carrier source and a SCA signal source, a swept interfering source comprising a sweep generator having a sweep frequency below 8 kc. in maximum which is synchronously swept by an output wave from a first standard frequency source providing an output consisting of a subharmonic of said 19 kc. pilot carrier, an added connected to said SCA signal source and said swept interfering source for mixing the signals supplied therefrom and providing a composite signal, a subcarrier FM modulator modulating an output wave of a subcarrier oscillator with said composite signal supplied from said adder through a pre-emphasis circuit, means for producing a main carrier signal, said frequency modulated subcarrier coupled to means for frequency modulating said main carrier signal, said receiver side having at least one FM tuner and demodulator supplying a partial amount of the output from the demodulator to a sound reproducing circuit and a partial amount to an SCA signal reproducing circuit, said SCA signal reproducing circuit having an FM detector for detecting the partial amount of said demodulator output supplied through a SCA channel band pass filter, an interference signal rejector connected to the output of said FM detector, a synchronizing signal generating means producing a second standard frequency having the same frequency as said first standard frequency source connected to said interference signal rejector for eliminating the interference signal, said synchronizing signal generating means including a phase shifter and a level control connected between said means producing said second standard frequency and said interference signal rejector so as to adjust the phase and level of a synchronizing signal, said interference signal rejector comprising a narrow band rejection filter, the rejection frequency of said filter being changed synchronously with a frequency of said swept interfering signal by the output of said synchronizing signal generating means, and means coupled to the output of said interference signal rejector for using said SCA signal.

2. A Subsidiary Communication Authorization (SCA) communication system comprising a transmitter side and a receiver side, said transmitter side including a 19 kc. pilot carrier source and a SCA signal source, a balanced modulator having one input connected to said SCA signal source and another input connected to a sweep generator having a frequency in the long to intermediate frequency range inclusive, said sweep generator being synchronously swept by the output wave from a first standard frequency source providing an output consisting of a subharmonic of said 19 kc. pilot carrier, the output of said balanced modulator being coupled to a frequency converter, the output of said frequency converter being connected to a subcarrier FM modulator through an 8 kc. low pass filter, means for producing a main carrier signal, the output of said subcarrier modulator being coupled to means for frequency modulating said main carrier signal, said receiver side having at least one FM tuner and demodulator supplying a partial amount of the output from the demodulator to a sound reproducing circuit and a partial amount to a SCA signal reproducing circuit, said SCA reproducing circuit having an FM detector for detecting the partial amount of said demodulator output supplied through a SCA channel band pass filter, the output from said FM detector being coupled to a frequency converter having its output coupled to one input of a single side band detector, another input of said single side band detector being coupled to a second sweep generator having the same frequency as said first sweep generator, the second sweep generator being synchronously swept by an output wave from a second standard frequency source having the same frequency as said first standard frequency source, and means coupled to the output of said single side band detector for using said SCA signal.

3. A Subsidiary Communication Authorization (SCA) communication system comprising a transmitter side and a receiver side, said transmitter side including a 19 kc. pilot carrier source and a SCA signal source, a swept interfering source comprising a sweep genreator having a sweep frequency below 8 kc. in maximum which is synchronously swept by an output wave from a first standard frequency source providing an output consisting of a commercial supply frequency, an adder connected to said SCA signal source and said swept interfering source for mixing the signals supplied therefrom and providing a composite signal, a subcarrier FM modulator modulating an output wave of a subcarrier oscillator with said composite signal supplied from said adder through a pre-emphasis circuit, means for producing a main carrier signal, said frequency modulated subcarrier coupled to means for frequency modulating said main carrier signal, said receiver side having at least one FM tuner and demodulator supplying a partial amount of the output from the demodulator to a sound reproducing circuit and a partial amount to an SCA signal reproducing circuit, said SCA signal reproducing circuit having an FM detector for detecting the partial amount of said demodulator output supplied through a SCA channel band pass filter, an interference signal rejector connected to the output of said FM detector, a synchronizing signal generating means producing a second standard frequency having the same frequency as said first standard frequency source connected to said interference signal rejector for eliminating the interference signal, said synchronizing signal generating means including a phase shifter and a level control connected between said means producing said second standard frequency and said interference signal rejector so as to adjust the phase and level of a synchronizing signal, said interference signal rejector comprising a narrow band rejection filter, the rejection frequency of said filter being changed synchronously with a frequency of said swept interfering signal by the output of said synchronizing signal generating means, and means coupled to the output of said interference signal rejector for using said SCA signal.

4. A Subsidiary Communication Authorization (SCA) communication system comprising a transmitter side and a receiver side, said transmitter side including a 19 kc. pilot carrier source and a SCA signal source, a balanced modulator having one input connected to said SCA signal source and another input connected to a sweep generator having a frequency in the long to intermediate frequency range inclusive, said sweep generator being synchronously swept by the output wave from a first standard frequency source providing an output consisting of a commercial supply frequency, the output of said balanced modulator being coupled to a frequency converter, the output of said frequency converter being connected to a subcarrier FM modulator through a 8 kc. low pass filter, means for producing a main carrier signal, the output of said subcarrier modulator being coupled to means for frequency modulating said main carrier signal, said receiver side having at least one FM tuner and demodulator supplying a partial amount of the output from the demodulator to a sound reproducing circuit and a partial amount to a SCA signal reproducing circuit, said SCA reproducing circuit having an FM detector for detecting the partial amount of said demodulator output supplied through a SCA channel band pass filter, the output from said FM detector being coupled to a frequency converter having its output coupled to one input of a single side band detector, another input of said single side band detector being coupled to a second sweep generator having the same frequency as said first sweep generator, the second sweep generator being synchronously swept by an output wave from a second standard frequency source having the same frequency as said first standard frequency source, and means coupled to the output of said single side band detector for using said SCA signal.

5. A Subsidiary Communication Authorization (SCA) communication system comprising a transmitter side and a receiver side, said transmitter side including a 19 kc. pilot carrier source and a SCA signal source, a swept interfering source comprising a sweep generator having a sweep frequency below 8 kc. in maximum which is synchronously swept by an output wave from a first standard frequency source providing an output consisting of a harmonic of a commercial supply frequency above the fundamental, an adder connected to said SCA signal source and said swept interfering source for mixing the signals supplied therefrom and providing a composite signal, a subcarrier FM modulator modulating an output wave of a subcarrier oscillator with said composite signal supplied from said adder through a pre-emphasis circuit, means for producing a main carrier signal, said frequency modulated subcarrier coupled to means for frequency modulating said main carrier signal, said receiver side having at least one FM tuner and demodulator supplying a partial amount of the output from the demodulator to a sound reproducing circuit and a partial amount to an SCA signal reproducing circuit, said SCA signal reproducing circuit having an FM detector for detecting the partial amount of said demodulator output supplied through a SCA channel band pass filter, an interference signal rejector connected to the output of said FM detector, a synchronizing signal generating means producing a second standard frequency having the same frequency as said first standard frequency source connected to said interference signal rejector for eliminating the intereference signal, said synchronizing signal generating means including a phase shifter and a level control connected between said means producing said second standard frequency and said interference signal rejector so as to adjust the phase and level of a synchronizing signal, said interference signal rejector comprising a narrow band rejection filter, the rejection frequency of said filter being changed synchronously with a frequency of said swept interfering signal by the output of said synchronizing signal generating means, and means coupled to the output of said interference signal rejector for using said SCA signal.

6. A Subsidiary Communication Authorization (SCA) communication system comprising a transmitter side and a receiver side, said transmitter side including a 19 kc. pilot carrier source and a SCA signal source, a balanced modulator having one input connected to said SCA signal source and another input connected to a sweep generator having a frequency in the long to intermediate frequency range inclusive, said sweep generator being synchronously swept by the output wave from a first standard frequency source providing an output consisting of a harmonic of a commercial supply frequency above the fundamental, the output of said balanced modulator being coupled to a frequency converter, the output of said frequency converter being connected to a subcarrier FM modulator through a 8 kc. low pass filter, means for producing a main carrier signal, the output of said subcarrier modulator being coupled to means for frequency modulating said main carrier signal, said receiver side having at least one FM tuner and demodulator supplying a partial amount of the output from the demodulator to a sound reproducing circuit and a partial amount to a SCA signal reproducing circuit, said SCA reproducing circuit having an FM detector for detecting the partial amount of said demodulator output supplied through a SCA channel band pass filter, the output from said FM detector being coupled to a frequency converter having its output coupled to one input of a single side band detector, another input of said single side band detector being coupled to a second sweep generator having the same frequency as said first sweep generator, the second sweep generator being synchronously swept by an output wave from a second standard frequency source having the same frequency as said first standard frequency source, and means coupled to the output of said single side band detector for using said SCA signal.

7. A Subsidiary Communication Authorization (SCA) communication system comprising a transmitter side and a receiver side, said transmitter side including a 19 kc. pilot carrier source and a SCA signal source, a swept interfering source comprising a sweep generator having a sweep frequency below 8 kc. in maximum which is synchronously swept by an output wave from a first standard frequency source, said first standard frequency source comprising means to select one of three signals from one of three signal sources consisting of means for producing a subharmonic of said 19 kc. pilot carrier, means for producing a commercial supply frequency, and means for producing higher harmonics of said commercial supply frequency, an adder connected to said SCA signal source and said swept interfering source for mixing the signals supplied therefrom and providing a composite signal, a subcarrier FM modulator modulating an output wave of a subcarrier oscillator with said composite signal supplied from said adder through a pre-emphasis circuit, means for producing a main carrier signal, said frequency modulated subcarrier coupled to means for frequency modulating said main carrier signal, said receiver side having at least one FM tuner and demodulator supplying a partial amount of the output from the demodulator to a sound reproducing circuit and a partial amount to an SCA signal reproducing circuit, said SCA signal reproducing circuit having an FM detector for detecting the partial amount of said demodulator output supplied through a SCA channel band pass filter, an interference signal rejector connected to the output of said FM detector, a synchronizing signal generating means producing a second standard frequency having the same frequency as said first standard frequency source connected to said interference signal rejector for eliminating the interference signal, said synchronizing signal generating means including a phase shifter and a level control connected between said means producing said second standard frequency and said interference signal rejector so as to adjust the phase and level of a synchronizing signal, said interference signal rejector comprising a narrow band rejection filter, the rejection frequency of said filter being changed synchronously with a frequency of said swept interfering signal by the output of said synchronizing signal generating means, and means coupled to the output of said interference signal rejector for using said SCA signal.

8. A Subsidiary Communication Authorization (SCA) communication system comprising a transmitter side and a receiver side, said transmitter side including a 19 kc. pilot carrier source and a SCA signal source, a balanced modulator having one input connected to said SCA signal source and another input connected to a sweep generator having a frequency in the long to intermediate frequency range inclusive, said sweep generator being synchronously swept by the output wave from a first standard frequency source, said first standard frequency source comprising means to select one of three signals from one of three signal sources consisting of means for producing a subharmonic of said 19 kc. pilot carrier, means for producing a commercial supply frequency and means for producing higher harmonics of said commercial supply frequency, the output of said balanced modulator being coupled to a frequency converter, the output of said frequency converter being connected to a subcarrier FM modulator through a 8 kc. low pass filter, means for producing a main carrier signal, the output of said subcarrier modulator being coupled to means for frequency modulating said main carrier signal, said receiver side having at least one FM tuner and demodulator supplying a partial amount of the output from the demodulator to a sound reproducing circuit and a partial amount to a SCA signal reproducing circuit, said SCA reproducing circuit having an FM detector for detecting the partial amount of said demodulator output supplied through a SCA channel band pass filter, the output from said FM detector being coupled to a frequency converter having its output coupled to one input of a single side band detector, another input of said single side band detector being coupled to a second sweep generator having the same frequency as said first sweep generator, the second sweep generator being synchronously swept by an output wave from a second standard frequency source having the same frequency as said first standard frequency source, and means coupled to the output of said single side band detector for using said SCA signal.

References Cited

UNITED STATES PATENTS

| | | | |
|---|---|---|---|
| 1,480,217 | 1/1924 | Mills | 325—24 |
| 1,571,010 | 1/1926 | Kendall | 179—1.5 |
| 1,622,033 | 3/1927 | Goldsmith et al. | 325—32 |
| 1,695,179 | 12/1928 | Clement | 325—32 |
| 2,399,469 | 4/1946 | Cook | 325—34 |
| 3,067,280 | 12/1962 | Schlafly | 179—1.5 X |
| 3,122,610 | 2/1964 | Csicsatka | 179—15 |
| 3,268,815 | 8/1966 | Banach | 325—122 |

ROBERT L. GRIFFIN, Primary Examiner

B. V. SAFOUREK, Assistant Examiner

U.S. Cl. X.R.

179—1.5; 325—32, 35, 45